United States Patent [19]

Domitter

[11] 4,307,604
[45] Dec. 29, 1981

[54] BRAKE TESTING DEVICE

[75] Inventor: Erich Domitter, Warren, Mich.

[73] Assignee: Dominion Tool & Die Company, Inc., Roseville, Mich.

[21] Appl. No.: 117,656

[22] Filed: Feb. 1, 1980

Related U.S. Application Data

[63] Continuation-in-part of Ser. No. 940,822, Sep. 8, 1978, Pat. No. 4,186,595.

[51] Int. Cl.³ .............................................. G01L 5/28
[52] U.S. Cl. ........................................ 73/121; 73/862.38
[58] Field of Search ................... 73/132, 118, 141 R, 73/168, 862.38, 862.62, 862.64, 121

[56] References Cited

U.S. PATENT DOCUMENTS 3,662,593  5/1972  Pirrella et al. ..................... 73/132
3,771,359  11/1973  Shoberg .......................... 73/141 A
3,995,475  12/1976  Cline ............................... 73/126

FOREIGN PATENT DOCUMENTS 678358  8/1979  U.S.S.R. ............................ 73/132

Primary Examiner—Jerry W. Myracle
Attorney, Agent, or Firm—Harness, Dickey & Pierce

[57] ABSTRACT

A device for testing a hydraulic circuit including the actuating cylinder and piston therefor. The testing device comprises a unitary assembly which is adapted to be clamped to the cylinder to be tested and which actuates the piston for pressurizing the associated hydraulic circuit. Sensing elements are incorporated for sensing the pressure applied to the hydraulic circuit and for sensing the amount of travel of the piston of the actuator during a given time period. In this way leaks or flaws in the hydraulic system may be readily detected.

14 Claims, 4 Drawing Figures

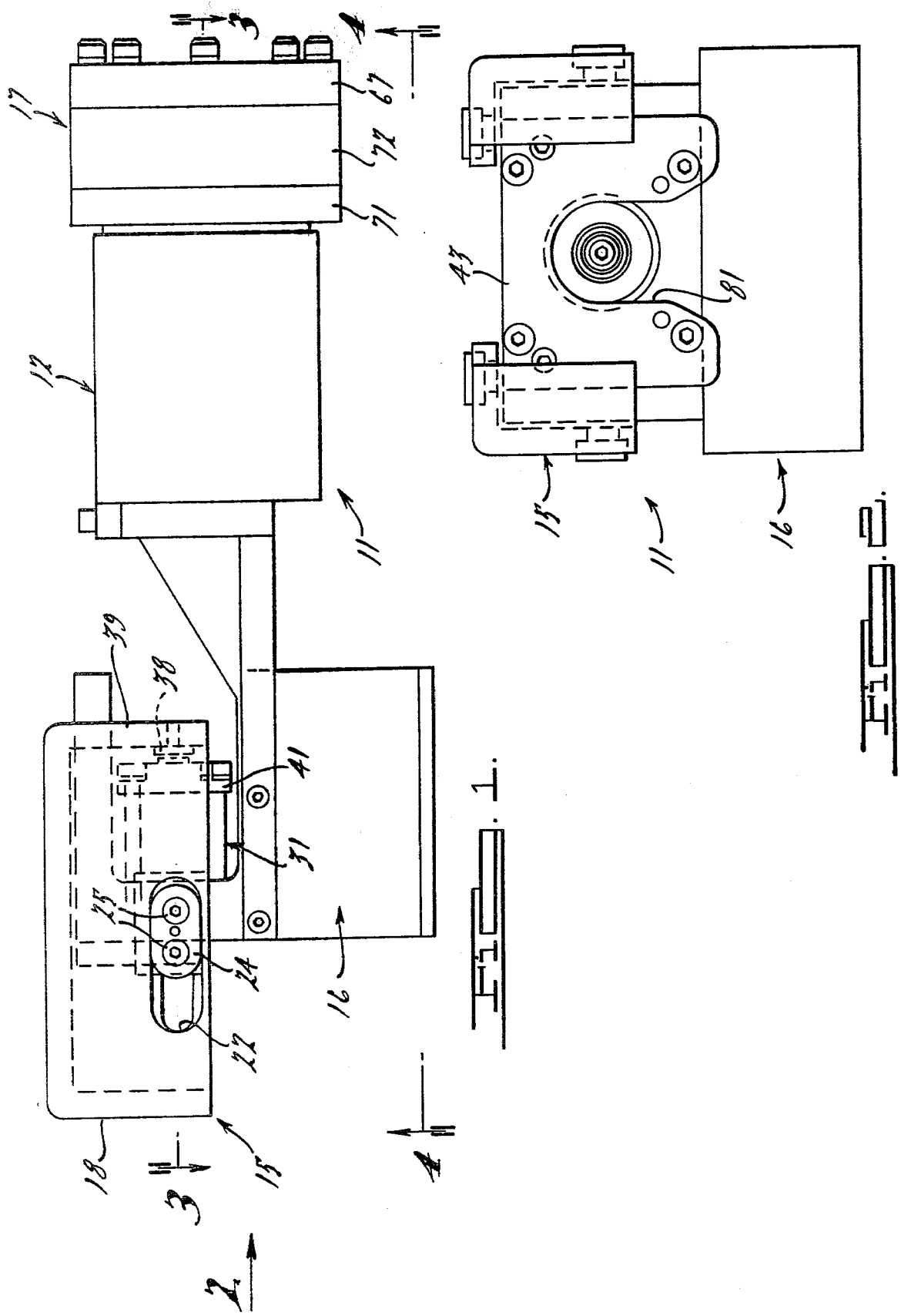

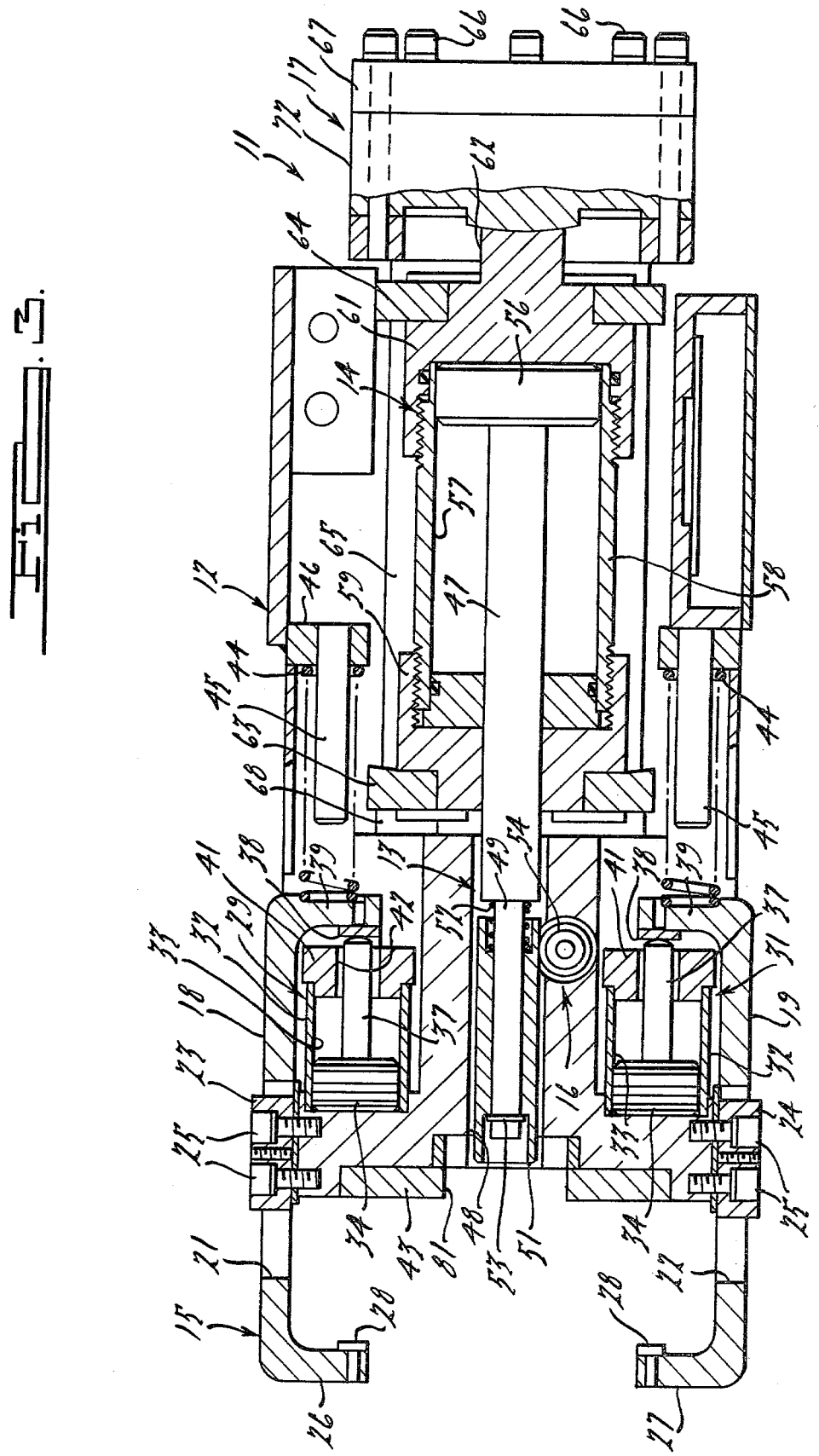

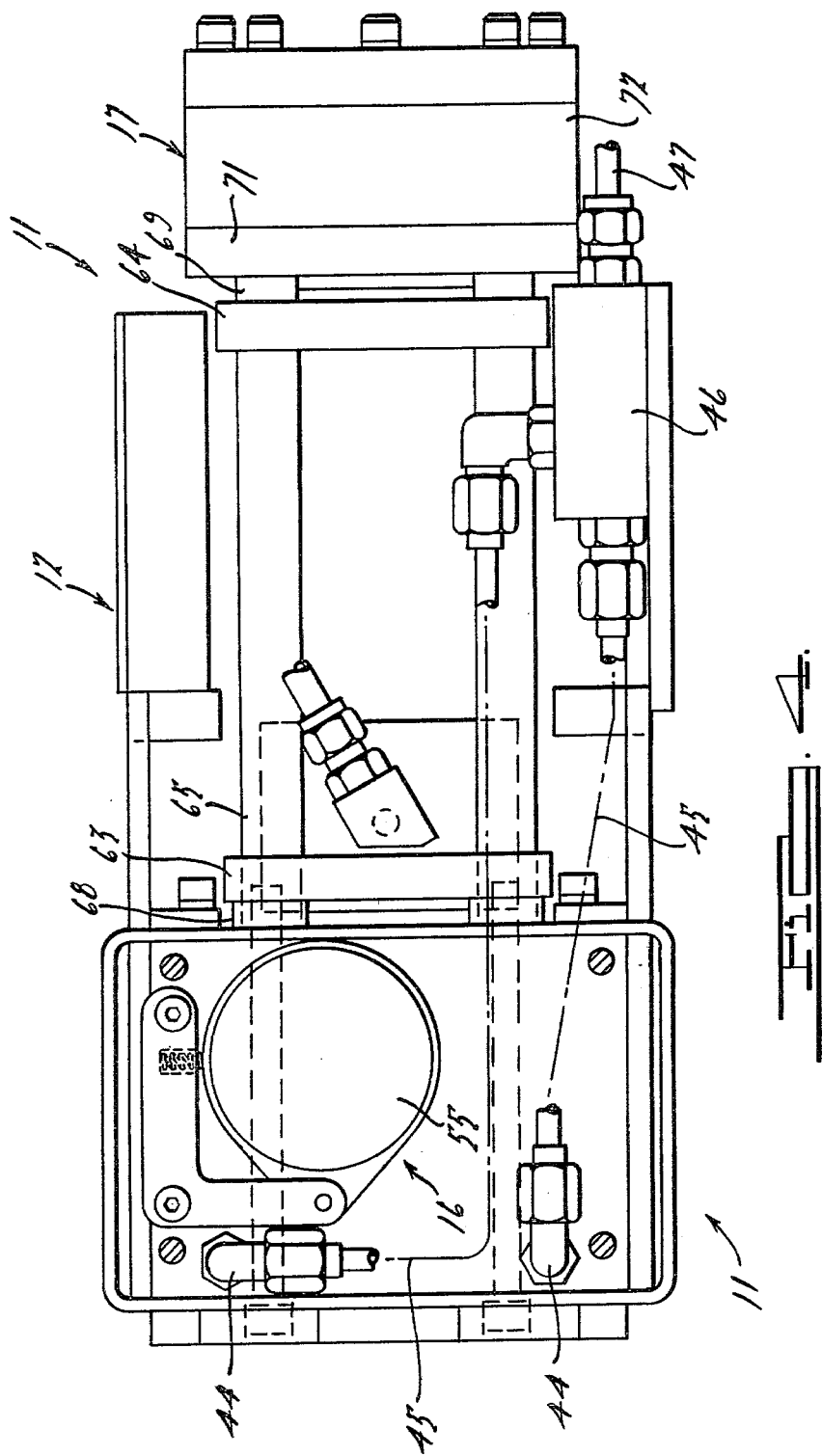

BRAKE TESTING DEVICE

CROSS REFERENCE TO RELATED APPLICATION

This application is a continuation in part of my application entitled Brake Testing Apparatus, Ser. No. 940,822, filed Sept. 8, 1978 now U.S. Pat No. 4,186,595 and assigned to the assignee of this application.

BACKGROUND OF THE INVENTION

This invention relates to a testing device and more particularly to an improved testing device for testing hydraulic circuits such as the brake system of a motor vehicle.

The need for testing of hydraulic circuits is well known. This necessity is particularly true in connection with the braking system for motor vehicles to insure that a vehicle embodying a defective braking system will not be delivered to the ultimate consumer. Devices have been proposed for testing such circuits by applying a pressure to the actuator of the circuit, either the brake pedal or the piston of the master cylinder, and sensing for leaks through either loss of pressure, excessive travel during a given time period or a combination of these factors. Prior art devices have all required separate components for sensing travel and pressure or have not directly measured either travel and/or pressure applied to the actuating element of the brake system. Where separate components are used, the setting up of the testing device is particularly cumbersome, particularly when used in an assembly line environment. In addition, the necessity of setting up separate elements introduces the possibility of error into the testing system.

Where the device does not directly sense pressure applied to the actuating element of the brake system, but rather interpolates it from the fluid pressure in the actuator of the testing device, such devices also introduce the possibility of inaccuracies, particularly where the hydraulic system of the actuating device may introduce errors which cancel out the effect of defects in the actual brake system.

It, therefore, a principal object of this invention to provide an improved simplified and yet accurate device for testing hydraulic systems.

It is a further object of this invention to provide an improved brake testing device, particularly adaped for directly actuating the master cylinder unit of an automotive braking system.

SUMMARY OF THE INVENTION

A first feature of this invention is adapted to be embodied in a testing device for a force generating device in which the testing device includes a supporting housing adapted to be fixed against movement relative to the device to be tested. A force applying portion is supported for movement by the supporting housing into engagement with the device to be tested. Power means are supported within the housing for moving the force applying portion relative to the supporting housing for applying a force. Distance sensing means are also incorporated within the housing for sensing the distance of travel of the force applying portion relative to the supporting housing. Force sensing means are carried by the housing for sensing a force applied to the device to be tested.

Another feature of this invention is adapted to be embodied in a testing device for testing master cylinders and associated hydraulic circuits. The testing device includes a supporting housing, clamping means carried by the housing for clamping the housing and its supported assemblage to the master cylinder and a force applying device carried by the housing and adapted to engage the actuating element of the master cylinder for pressurizing the associated cylinder and its hydraulic circuit. Distance sensing means are carried by the housing for sensing the movement of the force applying member. Power means are also provided in the housing for actuating the force applying member and generating the force to be applied to the master cylinder. A force sensing device is also carried by the housing and senses the force applied by the force applying member to the actuating element of the master cylinder.

BRIEF DESCRIPTION OF THE DRAWINGS

FIG. 1 is a side elevational view of a testing device embodying this invention, particularly adapted for testing automotive braking circuits through cooperation with the master cylinder thereof.

FIG. 2 is an end view of the device taken in the direction of the arrow "2" in FIG. 1.

FIG. 3 is an enlarged cross sectional view taken generally along the line 3—3 of FIG. 1.

FIG. 4 is a bottom plan view of the device taken along the line 4-4 of FIG. 1.

DETAILED DESCRIPTION OF THE PREFERRED EMBODIMENT

The reference numeral 11 indicates generally a testing device constructed in accordance with this invention. The testing device 11 is particularly adapted for testing of automotive braking systems by applying a force to the actuating element of the master cylinder and by sensing the travel of the actuating element during a given time period so as to test for leaks of air entrapment in the associated system. The testing device 11 includes a supporting housing assembly, indicated generally by the reference numeral 12, in which a force applying device, indicated generally by the reference numeral 13 is supported and which is actuated by a hydraulic cylinder assembly, indicated generally by the reference numeral 14. A clamping unit, indicated generally by the reference numeral 15 is also carried by the supporting housing assembly 12 for affixing the testing device 11 in relationship to the associated master cylinder to be tested (not shown). A travel or position measuring device 16 is also carried by the housing assembly 12 and is cooperative with the force applying device 13, in a manner to be described, for sensing the position and movement of the force applying device 13 and, accordingly, the actuating piston or plunger of the associated master cylinder. The main components of the testing device 11 are completed by means of a force transducer assembly, indicated generally by the reference numeral 17 which is also carried by the supporting housing assembly 12.

The clamp assembly includes a pair of clamp slides 18 and 19 positioned on opposite sides of the supporting housing assembly 12 and having respective longitudinally extending slots 21 and 22 formed therein. Guide members 23 and 24 are affixed to the supporting housing assembly 12 by means of socket headed screws 25 and extend through the slots 21 and 22, respectively, for guiding the movement of the clamp slides 18 and 19 between a released position and an engaged position. The outer ends of the clamp slides have inwardly extending arms 26 and 27 that are adapted to extend behind the flange of the associated master cylinder or as associated supporting element with this flange or element being engaged by locating buttons 28 carried by each of the arms 26 and 27.

The clamp slides 18 and 19 are actuated so as to affix the testing device 11 to clamp the master cylinder by means of clamp cylinders 29 and 31 associated with each of the clamp slides 18 and 19. Each of the clamp cylinders 29 and 31 includes a cylinder 32 which is affixed to the housing assembly 12 and which defines a bore 33 in which a respective piston 34 is positioned. The pistons 34 have piston rods 37 which engage buttons 38 affixed to inwardly extending arms 39 of the respective clamp slides 18 and 19. A closure plug 41 having a bore 42 to pass the piston rod 37 is affixed to and closes the end of each cylinder 32.

Means are provided for selectively admitting fluid under pressure to the portion of the cylinders 32 surrounding the heads of the pistons 34 so as to urge the pistons 34 and rods 37 to the right as shown in FIG. 1 from the shown released position to a clamping position. In the clamping position, the buttons 28 will engage the rear side of the flange of the master cylinder or its supporting bracket and a locating plate 43 affixed to the housing assembly 12 will engage the opposing side of the master cylinder and its associated boss around the bore in which the master cylinder plunger is supported.

The means for admitting the fluid under pressure to the cylinders 32 includes a pair of hydraulic fittings 44 which are connected by conduits schematically indicated at 45, to a common pressure source 46 (FIG. 4). The common pressure source 46 comprises a fitting to which fluid is supplied under pressure by means of a flexible conduit 47. The flexible conduit 47 permits the testing assembly 11 to float relative to the master cylinder during the test cycle and also permits the operator to place the test device 11 in position.

The clamping device 15 is released under the action of a pair of coil compression springs 44 that encircle pins 45 affixed to a ring 46 of the supporting housing assembly 12 and which bear against the rear of the arms 39 of the clamp slides 18 and 19. Thus, when no fluid pressure is exerted on the heads of the piston 34, the clamp slides 18 and 19 will be urged to their released position as shown in the figures.

The force applying device 13 includes a piston rod 47 of the fluid motor 14 which extends through a bore 48 of the supporting housing assembly 12. The outer end of the piston rod 47 has a reduced diameter 49 which is surrounded by a sleeve 51. A coil compression spring 52 encircles the inner end of the reduced diameter portion 49 and normally urges the sleeve 51 to an outwardly extending position. The movement in this direction is limited by means of a snap ring 53 that is affixed to the outer end of the reduced diameter portion 49. The input shaft 54 of a rotary encoder 55 which comprises the travel and positioning sensing device 16 is engaged with the sleeve 51 so as to drive the rotary encoder 55 upon movement of the sleeve 51, as will become apparent.

The fluid motor 14 consists of a piston 56 that is affixed to the piston rod 47 and which is contained within the cylinder bore 57 of a cylinder 58. One end of the cylinder 58 is capped by a head assembly 59 which is juxtaposed to the master cylinder end of the device. The opposite end is capped by a head assembly 61 which has an extending portion 62 that engages and actuates the force transducer 17 in a manner which will become apparent. The cylinder assembly consisting of the cylinder 58 and heads 59 and 61 is supported between a pair of resilient urethane collars 63 and 64. The collars 63 and 64 have apertures (not shown) which pass four guide rods 65. The left hand end of the guide rods 65, as viewed in FIGS. 1, 3 and 4, are rigidly affixed to the supporting housing assembly 12. The opposite ends of the guide rods are affixed by socket head screws 66 to a back up plate 67 of the force transducer 17. Rigid sleeves 68 (FIGS. 3 and 4) encircle the guide rods 65 and are interposed between an element of the housing assembly 12 and the urethane ring 63 so as to maintain contact between the cylinder and the supporting housing assembly 12. In a like manner, sleeves 69 encircle the opposite ends of the guide rods 65 and are contained between the urethane collar 64 and a compression ring 71 which encircles the transducer assembly 17.

The transducer assembly 17 includes a force transducer element 72 which is of the strain gage type and is capable of measuring pressures through deformation. This deformation of the element 72 is accomplished by the relatively minute relative movement between the cylinder assembly 14 and particularly the piston head projection 62 and the supporting housing assembly 12 which will occur, as will be described due to the deformation of the urethane collar 64.

OPERATION

It is to be understood that the test device 11 is used in conjunction with an appropriate control computer and hydraulic circuit that will provide the desired test sequence and readouts to determine if the tested master cylinder and associated hydraulic circuit are acceptable. Since this portion of the construction is believed to be well within the scope of those skilled in the art, it has not been described in detail. Also, although a specific test sequence will be described in conjunction with the apparatus 11, it is to be understood that other test sequences can be used in conjunction with the structure which forms the part of this invention.

The drawings illustrate the test device 11 in its released non-actuated position prior to assembly onto the system to be tested. In a preferred embodiment of the invention, the system to be tested will be the braking circuit of a motor vehicle and this testing will take place on the assembly line. To accomplish this testing, the device 11 is positioned in the vehicle so that the clamping slides 18 and 19 will have their arms 26 and 27 located behind either the flange of the master cylinder or the supporting bracket associated therewith. The locating plate 43 has an opening 81 that receives the projection of the master cylinder through which the brake actuator extends. Thus, the opening 81 provides a rough locating function for the device 11 relative to the master cylinder.

Once the unit 11 is in place, the operator will actuate the test sequence. Under the control of the computer (not shown) or of the master control unit, fluid will be admitted under pressure to the cylinders 32 on the heads of the pistons 34 to actuate the clamping device 15. The master cylinder flange or supporting bracket will be clamped between the clamping slide arms 26 and 27 and the locating plate 23. The springs 44 will be compressed during this clamping operation.

When the master cylinder is so clamped, the sleeve 51 will move to engagement with the plunger or piston which actuates the master cylinder. Normally the arrangement is such that engagement between the sleeve 51 and the master cylinder plunger will occur when the clamping slides 18 and 19 are engaged. When this occurs, the spring 52 will be compressed and the piston rod portion 49 will move relative to the sleeve 51.

During this relative movement, the input shaft 54 of the rotary encoder will be rotated. The spring 52, therefore, accommodates tolerance in the mounting arrangement and tolerance in the at rest position of the plunger. In some instances, the sleeve 51 still may be engaged with the master cylinder plunger at this time.

Once the clamping has been completed, the test sequence is begun and the hydraulic cylinder 58 is pressurized on the head of the piston 56. Initial movement will cause compression of the spring 52 once the sleeve 51 has become engaged with the plunger of the master cylinder, assuming that this engagement did not occur previously.

During the initial movement and until the spring 52 is completely compressed, the rotary encoder 55 transmits a home or at rest signal which is converted by the associated computer or test control module into a zero or home position indication.

Pressurization of the fluid motor 14 will continue to occur and the sleeve 51 will cause movement of the master cylinder plunger or piston so as to pressurize the associated hydraulic circuit. As pressure is built up in this circuit, a reactive force will be exerted on the cylinder assembly of the fluid motor 14 so that the pressure will be sensed by the transducer 72.

In one test sequence, the pressurization will continue until a predetermined pressure is exerted in the brake system, as related to the output signal of the transducer 72, which is transmitted back to the computer or control device through any appropriate electrical circuit. It may be desirable in some test sequences to selectively cause this pressurization to in effect "pump" the brakes for providing a bleed.

In any event, eventually the computer will initiate a test sequence wherein a certain pressure is established in the brake circuit by exerting a certain force on the master cylinder, as sensed by the transducer 72. Once this force is exerted, the rotary encoder 55 will provide a signal indicating the amount of travel of the plunger necessary to achieve this force resistance. This travel may be used as a first indication of the satisfactory operation of the brake circuit.

In accordance with the preferred test mode, the pressure is maintained at a uniform value through cooperation by the pressure transducer 72 and the device which pressurizes the fluid motor 14. Any additional travel of the plunger during this test condition will be sensed by the rotary endoder 55 to again provide a fail or pass signal depending upon the associated test arrangement. Once the test sequence is completed, the fluid motor 14 is actuated so as to reverse the piston 54, through suitable hydraulic circuitry, and when the piston 56 is at its home position the clamping device 16 is released by depressurization of the cylinders 32. The springs 44 will then release the clamping device so that it can be removed from the vehicle and moved to the next test location.

It is to be understood that only certain examples of test sequences have been described. It should be readily apparent that many other types of testing sequences are possible with the described construction and that the particular test sequence employed forms no part of this invention. It should be readily apparent, however, that the device 11, because of its compact and unitary construction wherein the clamping arrangement, force generating device, pressure transducer and motion sensing device are all carried by a common housing, permits a wide latitude of test procedure with extremely high accuracy. Various changes and modifications may be made from the illustrated embodiment without departing from the spirit and scope of the invention, as defined by the appended claims.

1. A testing device for a force generating device comprising a supporting housing adapted to be fixed against movement relative to the device, a force applying portion supported for movement by said supporting housing into engagement with the device, power means within said housing for moving said force applying portion relative to said supporting portion for applying a force to the device, distance sensing means within said housing for sensing the distance of travel of said force applying portion relative to the supporting housing and force sensing means carried by said housing for sensing the force applied to said device.

2. A testing device as set forth in claim 1 wherein the force generation device comprises a hydraulic cylinder and piston assembly and the force applying portion is adapted to directly engage the piston assembly.

3. A testing device as set forth in claim 2 wherein the distance sensing means comprises a rotary encoder.

4. A testing device as set forth in claim 3 wherein the power means comprises a fluid motor.

5. A testing device as set forth in claim 2 further including clamp means carried by the supporting housing for affixing the supporting housing to the force generating device and power operated means for moving said clamp means to its clamping position.

6. A testing device as set forth in claim 5 wherein the clamp means is effective to affix the testing device to the generating device with the force applying portion in registry with the actuating element of the force generating device.

7. A testing device as set forth in claim 6 wherein the power means comprises a fluid motor and the force sensing means is actuated by a reactive force generated by said fluid motor.

8. A testing device as set forth in claim 7 wherein the force applying portion comprises a member affixed to the rod of the piston of the fluid motor, the distance sensing means comprising means for sensing the movement of said force applying portion.

9. A testing device as set forth in claim 8 wherein the clamping means comprises a pair of jaws slidably supported by the supporting housing and a fluid motor for actuating said jaws.

10. A testing device for testing master cylinders and associated hydraulic circuits comprising a supporting housing, clamping means carried by said supporting housing and actuable between a released position and a clamping position for affixing said supporting housing to the master cylinder to be tested, a force applying force device carried by said housing and adapted to engage the actuating element of the master cylinder for pressurizing the master cylinder and its hydraulic circuit upon actuation of said force applying device, distance sensing means carried by said housing for sensing the degree of movement of said force applying device, power means carried by said housing for actuating said force applying device and applying pressure to the actuating element of the master cylinder, and a force sensing device carried by said housing for sensing the force generated by said power means.

11. A testing device as set forth in claim 10 wherein the power means comprise a fluid motor carried by the housing, the force applying device being operatively connected to the piston of said fluid motor.

12. A testing device as set forth in claim 11 wherein the force applying device comprises a sleeve slidably supported on the rod of the piston and biasing means for urging said sleeve toward the actuating device of the master cylinder.

13. A testing device as set forth in claim 12 wherein the distance sensing means comprises a rotary encoder operatively connected to the force applying device.

14. A testing device as set forth in claim 13 wherein the force sensing device comprises a pressure transducer, the cylinder of the fluid motor being operatively engaged with said pressure transducer for exerting a reactive force thereupon to provide the force indication.

* * * * *